United States Patent [19]

Brandt et al.

[11] Patent Number: 5,425,431
[45] Date of Patent: Jun. 20, 1995

[54] INTERLOCK CONTROL SYSTEM FOR POWER MACHINE

[75] Inventors: Kenneth A. Brandt, Fargo; Scott B. Jacobson, Kindred; Orlan J. Loraas, Lisbon, all of N. Dak.

[73] Assignee: Clark Equipment Company, Fargo, N. Dak.

[21] Appl. No.: 198,847

[22] Filed: Feb. 18, 1994

[51] Int. Cl.$^6$ ............... B60K 28/04; B60R 21/00; B60Q 1/00; G08B 5/36
[52] U.S. Cl. ............... 180/273; 180/269; 340/461; 340/525; 340/667; 364/424.07; 414/699
[58] Field of Search ............... 180/273, 272, 271, 269, 180/268, 286; 340/459, 461, 517, 518, 525, 667, 679, 684; 364/146, 188, 424.07; 414/699, 685

[56] References Cited

U.S. PATENT DOCUMENTS

| | | | |
|---|---|---|---|
| 2,606,626 | 8/1952 | Meyer | 180/82 |
| 3,215,221 | 11/1965 | Rayman | 180/82 |
| 3,340,523 | 9/1967 | Whitman | 340/278 |
| 3,449,714 | 6/1969 | Farley, Jr. | 340/52 |
| 3,455,410 | 7/1969 | Wilson | 180/82 |
| 3,487,451 | 12/1969 | Fontaine | 303/19 |
| 3,500,946 | 3/1970 | Boyajian | 180/101 |
| 3,507,350 | 4/1970 | Boyajian | 180/101 |
| 3,740,711 | 6/1973 | Bell | 340/52 |
| 3,749,866 | 7/1973 | Tizakun et al. | 200/85 |
| 3,787,804 | 1/1974 | MacDonald | 340/52 |
| 3,788,431 | 1/1974 | York | 188/109 |
| 3,790,223 | 2/1974 | Fontaine | 303/19 |
| 3,838,748 | 10/1974 | Gray et al. | 180/101 |
| 3,864,668 | 2/1975 | Bickford | 340/52 |
| 3,892,294 | 7/1975 | Nieminski | 188/109 |
| 3,912,939 | 10/1975 | Quantz et al. | 307/10 |
| 3,927,776 | 12/1975 | Steiger | 214/140 |
| 3,960,235 | 6/1976 | Iijima | 180/82 |
| 3,986,093 | 10/1976 | Wakamatsu et al. | 318/484 |
| 4,019,602 | 4/1977 | Habiger | 180/101 |
| 4,034,335 | 7/1977 | Harazoe et al. | 340/459 |
| 4,053,868 | 10/1977 | Cox et al. | 340/461 |
| 4,059,196 | 11/1977 | Uchino et al. | 214/138 |
| 4,091,889 | 5/1978 | Brown et al. | 180/101 |
| 4,096,468 | 6/1978 | Kopera, Jr. | 340/52 |
| 4,103,842 | 8/1978 | Martin et al. | 242/107 |
| 4,116,296 | 9/1978 | Pleier et al. | 180/101 |
| 4,172,980 | 10/1979 | Hsieh et al. | 307/9 |
| 4,267,544 | 5/1981 | Wiblin | 338/32 |
| 4,285,418 | 8/1981 | Paine | 188/109 |
| 4,296,410 | 10/1981 | Higgs et al. | 340/686 |
| 4,313,519 | 2/1982 | Lipschutz | 180/270 |
| 4,317,500 | 3/1982 | Bening | 180/273 |
| 4,320,819 | 3/1982 | Erker | 188/109 |
| 4,344,502 | 8/1982 | Terabayashi | 180/268 |
| 4,355,698 | 10/1982 | Barnes et al. | 180/273 |
| 4,361,741 | 11/1982 | Leskoverc et al. | 200/85 |

(List continued on next page.)

OTHER PUBLICATIONS

"Fluid Power in Action: Mobile Equipment" by R. T. Schneider, Aug. 1983 *Hydraulics & Pneumatics*, pp. 29–32.

*Primary Examiner*—Margaret A. Focarino
*Assistant Examiner*—Peter C. English
*Attorney, Agent, or Firm*—Westman, Champlin & Kelly

[57] ABSTRACT

An apparatus controls operation of a power machine which has a frame, a seat supported by the frame, wheels supporting the frame, a drive mechanism for driving the wheels, a lift arm structure manipulated by power actuators, and a power circuit for controlling the actuators. An occupancy sensor is coupled to the power machine for providing an occupancy signal indicative of occupancy in the seat. A traction lockout mechanism locks the drive mechanism to preclude the drive mechanism from driving the wheels. A controller is coupled to the occupancy sensor, the traction lockout device and the power lockout device and controls the traction lockout device and power lockout device based upon the input from the occupancy sensor. A display is coupled to the controller for displaying the indicia indicative of an operational state based on a display output signal provided by the controller.

27 Claims, 3 Drawing Sheets

U.S. PATENT DOCUMENTS

| | | | |
|---|---|---|---|
| 4,371,741 | 2/1983 | Ando et al. | 174/15 |
| 4,385,863 | 5/1983 | Minor | 414/699 |
| 4,388,980 | 6/1983 | Vig et al. | 180/271 |
| 4,389,154 | 6/1983 | Minor et al. | 414/699 |
| 4,391,344 | 7/1983 | Weber et al. | 180/271 |
| 4,392,544 | 7/1983 | Dilno | 180/273 |
| 4,397,371 | 8/1983 | Lynnes et al. | 180/271 |
| 4,398,618 | 8/1983 | Hansen | 180/273 |
| 4,466,504 | 8/1984 | Giandenoto et al. | 180/273 |
| 4,480,713 | 11/1984 | Macht et al. | 180/268 |
| 4,546,266 | 10/1985 | Zenick et al. | 307/10 |
| 4,550,597 | 11/1985 | Drutchas et al. | 73/118 |
| 4,579,191 | 4/1986 | Klee et al. | 180/268 |
| 4,655,313 | 4/1987 | Hicks | 180/273 |
| 4,673,054 | 6/1987 | Burke et al. | 180/271 |
| 4,706,194 | 11/1987 | Webb et al. | 364/424 |
| 4,727,353 | 2/1988 | Ruhter | 340/525 |
| 4,759,185 | 7/1988 | McConnell et al. | 60/444 |
| 4,796,013 | 1/1989 | Yasuda et al. | 340/562 |
| 4,844,196 | 7/1989 | Clevenger, Jr. et al. | 180/273 |
| 4,856,612 | 8/1989 | Clevenger, Jr. et al. | 180/273 |
| 4,871,044 | 10/1989 | Strosser et al. | 180/273 |
| 4,902,039 | 2/1990 | Kawai et al. | 280/802 |
| 4,909,560 | 3/1990 | Ginn | 296/65 |
| 4,951,963 | 8/1990 | Behr et al. | 280/753 |
| 4,955,452 | 9/1990 | Simonz | 180/271 |
| 5,050,700 | 9/1991 | Kim | 180/268 |
| 5,109,945 | 5/1992 | Koga | 180/273 |
| 5,129,478 | 7/1992 | Suenaga et al. | 180/263 |
| 5,203,440 | 4/1993 | Peterson, Jr. et al. | 192/0.094 |

INTERLOCK CONTROL SYSTEM FOR POWER MACHINE

REFERENCE TO CO-PENDING APPLICATIONS

Reference is made to the following co-pending U.S. patent applications:

Co-pending U.S. patent application Ser. No. 08/198,957, filed on Feb. 18, 1994, entitled TRACTION LOCK, and assigned to the same assignee as the present invention.

Co-pending U.S. patent application Ser. No. 08/199,827, filed on Feb. 22, 1994, entitled HALL EFFECT SENSOR ASSEMBLY, and assigned to the same assignee as the present invention.

Co-pending U.S. patent application Ser. No. 08/199,120, filed on Feb. 22, 1994, entitled HYDRAULIC INTERLOCK SYSTEM, and assigned to the same assignee as the present invention.

BACKGROUND OF THE INVENTION

The present invention relates to power machinery. More particularly, the present invention relates to an apparatus for controlling operation of a lockout system for power machinery.

Power machines, such as skid steer loaders, typically have a frame which supports a cab and a movable lift arm which, in turn, supports a work tool such as a bucket. The movable lift arm is pivotally coupled to the frame of the skid steer loader by power actuators which are commonly hydraulic cylinders. In addition, the tool is coupled to the lift arm by another power actuator which is also commonly a hydraulic cylinder. An operator manipulating the skid steer loader raises and lowers the lift arm, and manipulates the tool, by actuating the hydraulic cylinders coupled to the lift arm, and the hydraulic cylinder coupled to the tool. When the operator causes the hydraulic cylinders coupled to the lift arm to increase in length, the lift arm moves generally vertically upward. Conversely, when the operator causes the hydraulic cylinders coupled to the lift arm to decrease in length, the lift arm moves generally vertically downward. Similarly, the operator can manipulate the tool (e.g., tilt the bucket) by controlling the hydraulic cylinder coupled to the lift arm and the working tool to increase or decrease in length, as desired.

Skid steer loaders also commonly have an engine which drives a hydraulic pump to, in turn, power hydraulic traction motors which power movement of the skid steer loader. The traction motors are commonly coupled to the wheels through a drive mechanism such as a chain drive.

It is desirable that, under certain circumstances, the lift arm, the tool, the traction mechanism, or all three, be rendered inoperable. For example, in some prior devices, when an operator leaves the cab of the skid steer loader or assumes an improper operating position, the hydraulic cylinders used to raise and lower the lift arm are locked out of operation. In such prior devices, an operator presence switch is coupled to the hydraulic circuit controlling the hydraulic cylinders to render the hydraulic lift cylinders inoperable when the operator presence switch indicates that the operator is in an improper operating position. One example of such a system is set out in the Minor et al U.S. Pat. No. 4,389,154.

In addition, in some prior devices, movable operator restraint bars are provided. When the operator restraint bars are moved to a retracted or inoperative position, mechanical brakes or wheel locks lock the wheels of the skid steer loader. One example of such a system is set out in the Simonz U.S. Pat. No. 4,955,452.

SUMMARY OF THE INVENTION

The present invention arises from the realization that, under certain circumstances, it is advantageous to override any mechanism which locks out a drive device used to drive the wheels of the skid steer loader. The present invention also arises from the realization that a diagnostic display, available to the operator of the skid steer loader, would be highly advantageous in monitoring operational conditions of the skid steer loader control system.

Thus, in one preferred embodiment, the present invention provides a traction lock override device for providing a traction lock override signal to enable the drive mechanism even during a lockout condition.

In another preferred embodiment, the present invention includes a diagnostic display mechanism. The diagnostic display mechanism is coupled to the controller to provide a diagnostic display indicative of operational conditions sensed by the controller.

DETAILED DESCRIPTION OF THE PREFERRED EMBODIMENTS

Overview

Figure 1:
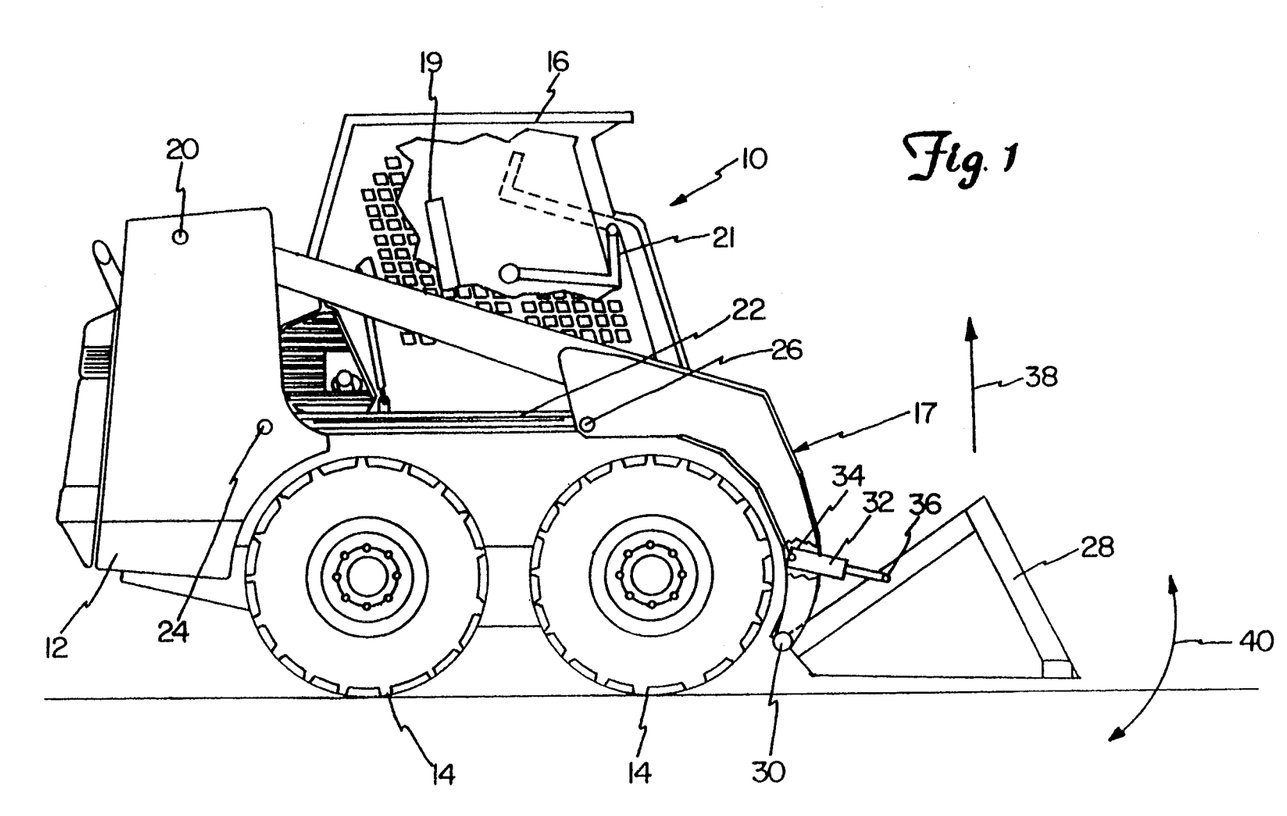
FIG. 1 is a side elevational view of a skid steer loader of the present invention.

FIG. 1 is a side elevational view of a skid steer loader 10 of the present invention. Skid steer loader 10 includes a frame 12 supported by wheels 14. Frame 12 also supports a cab 16 which defines an operator compartment and which substantially encloses a seat 19 on which an operator sits to control skid steer loader 10. A seat bar 21 is pivotally coupled to a front portion of cab 16. When the operator occupies seat 19, the operator then pivots seat bar 21 from the raised position (shown in phantom in FIG. 1) to the lowered position shown in FIG. 1.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is also coupled to a working tool which, in this preferred embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only one cylinder 32 is shown, it is to be understood that any desired number of cylinders could be used to work bucket 28 or any other suitable tool.

The operator residing in cab 16 can manipulate lift arm 17 and bucket 28 by selectively actuating hydraulic cylinders 22 and 32. By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22 causing it to decrease in length bucket 28 moves generally vertically downward to the position shown in FIG. 1.

The operator can also manipulate bucket 28 by actuating cylinder 32. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

Lockout Control Circuit 42

Figure 2:
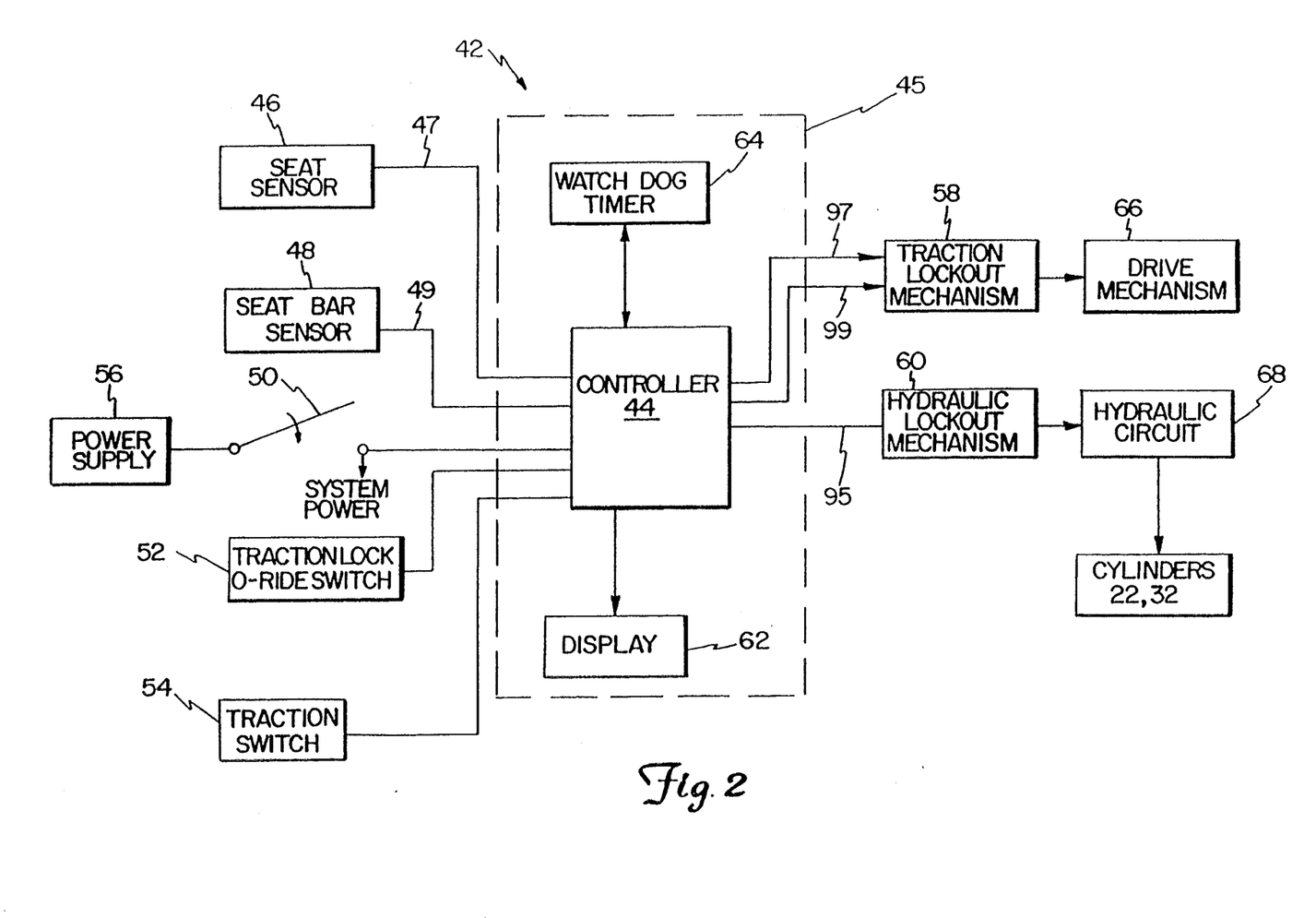
FIG. 2 is a block diagram of a control system of the present invention.

Control circuit 42 includes controller 44 which receives inputs from seat sensor 46, seat bar sensor 48, ignition switch 50, traction lock override switch 52 and traction lock switch 54. Ignition switch 50 is coupled to a power supply 56. Upon closing of ignition switch 50, power is supplied from power supply 56 to the remainder of the system.

Based on the inputs received, controller 44 provides two outputs to traction lock mechanism 58, an output to hydraulic lock mechanism 60 and an output to display 62 which is integrated in controller 45 in the preferred embodiment. Controller 44 also provides an output to watchdog timer 64 which is also integrated in controller assembly 45 in the preferred embodiment.

Based on the inputs from controller 44, traction lock mechanism 58 and hydraulic lock mechanism 60 provide outputs to drive mechanism 66 and hydraulic circuit 68. Hydraulic circuit 68, in turn, provides an output to lift and tilt cylinders 22 and 32.

In operation, seat sensor 46 senses occupancy in seat 19. In the preferred embodiment, seat sensor 46 is a Hall effect sensor which is more particularly described in co-pending U.S. patent application Ser. No. 08/199,827, filed on Feb. 22, 1994, and assigned to the same assignee as the present invention. However, seat sensor 46, could be any suitable seat sensor sensing occupancy in seat 19. Seat sensor 46 provides a signal to controller 44 indicating whether seat 19 is occupied or unoccupied.

Seat bar sensor 48, in the preferred embodiment, is also a Hall effect position sensor more fully described in co-pending U.S. patent application Ser. No. 08/199,827, filed on Feb. 22, 1994, and assigned to the same assignee as the present invention. Seat bar sensor 48 is activated when the operator pulls seat bar 21 into the lowered position shown in FIG. 1. In the preferred embodiment, seat bar sensor 48 provides a signal to controller 44 which is active when seat bar 21 is in the lowered position and inactive when seat bar 21 is in the raised position. While seat bar sensor 48 is preferably the Hall effect sensor described in the above-mentioned co-pending U.S. patent application, any suitable position switch can be used as seat bar sensor 48.

Ignition switch 50 is a typical key-type ignition switch used in supplying power from power supply 56 to the basic electrical system in skid steer loader 10. Upon the closure of ignition switch 50, power is also supplied to controller 44 and it senses that switch 50 is closed.

Traction lock switch 54 is an operator-controlled pedal actuated switch accessible from the operator compartment defined by cab 16. The pedal is preferably configured as an over-center device. When the operator actuates traction lock switch 54, traction lock switch 54 provides an input to controller 44 requesting controller 44 to activate traction lock mechanism 58.

Traction lock override switch 52 is a manually operated switch which is also preferably located in the operator compartment defined by cab 16. Switch 52 can be of any suitable configuration, but is preferably a push button switch located on a dash panel in a forward region of the operator compartment.

Figure 2A:
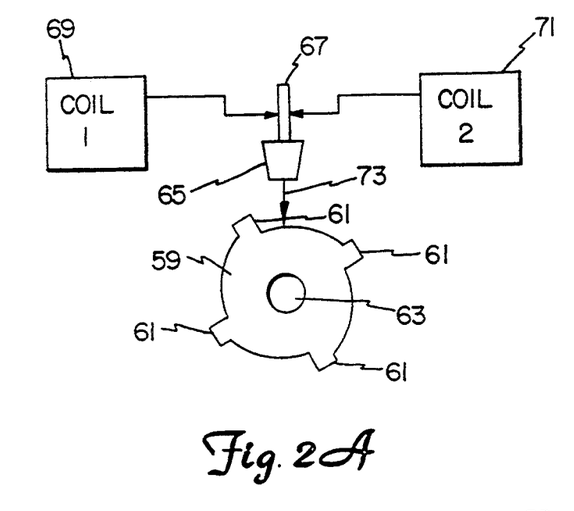
FIG. 2A is a more detailed block diagram of a traction lock mechanism.

The traction lock mechanism 58, in the preferred embodiment, comprises the mechanism more fully described in co-pending U.S. patent application Ser. No. 08/198,957, filed on Feb. 18, 1994, and assigned to the same assignee as the present application. Briefly, in the co-pending application, traction lock out mechanism 58 is configured as shown in FIG. 2A with a disc 59 having a number of lugs 61 mounted to a portion of the drive mechanism 66, such as one of the dune axles 63 or a drive train component used in driving wheels 14 on loader 10. A wedge 65 is manipulated by a solenoid slug or plunger 67 which is coupled to two coils 69 and 71. The coils are shown schematically and actually are coiled one inside the other around the slug 67. When the wedge 65 is allowed to drop onto the disc 59 in the direction indicated by arrow 73, the wedge 65 is engaged by a lug 61 and locks up the axle 63 precluding rotation of axle 63 and therefore precluding movement of loader 10. When the wedge 65 is lifted out of the path of lugs 61 on the disc 59, the axle 63 is unlocked and the loader 10 is allowed to move.

The two coils 69 and 71 operating the solenoid 67 include first coil 69 which is a relatively high current coil that is used to pull the wedge 65 up to clear lugs 61. Once the wedge 65 is pulled out of the path of lugs 61, the first coil 69 (the pull coil) is de-energized and second, hold coil 71, is energized. The hold coil 71 is a lower current coil which is used to hold the metal wedge 65 in place, out of engagement with the disc 59 mounted to the axle 63. Thus, controller 44 controls the coils to either allow the wedge 65 to drop into the path of lugs 61 on the drive mechanism 66 thereby locking the drive mechanism 66, or to pull and hold the wedge 65 out of engagement with the drive mechanism 66, thus allowing the loader 10 to move.

Hydraulic lock mechanism 60 is more fully described in co-pending U.S. patent application Ser. No. 08/199,120, filed Feb. 22, 1994, and assigned to the same assignee as the present invention. Briefly, hydraulic circuit 68 includes hydraulic valves which are actuated to provide fluid under pressure to cylinders 22 and 32 to achieve desired manipulation of cylinders 22 and 32. Hydraulic lock mechanism 60, in the preferred embodiment, includes any number of lock valves interposed between the valves in hydraulic circuit 68 and cylinders 22 and 32. Upon receiving appropriate control signals from controller 44, the lock valves and hydraulic lock mechanism 60 preclude hydraulic circuit 68 from providing fluid under pressure to cylinders 22 and 32, thereby locking operation of cylinders 22 and 32, or allowing only selected operations of cylinders 22.

Normal Operation of Circuit 42

During normal operation of circuit 42, an operator enters the operator compartment defined by cab 16 and occupies seat 19. The operator then lowers seat bar 21 into the lowered position shown in FIG. 1. The operator then closes ignition switch 50 supplying power to the basic electrical system and to controller assembly 45 and to the remainder of the control system. Sensors 46 and 48 provide signals to controller 44 indicating that seat 19 is occupied and that seat bar 21 is in the lowered position. It should be noted that the signals from seat sensor 46 and seat bar sensor 48 need not be provided to controller 44 in any particular sequence. Rather, controller 44 must simply receive the signals from the appropriate sensors, regardless of the sequence, in order to allow continued operation of loader 10.

Upon receiving such signals, controller 44 provides the appropriate signals to traction lock mechanism 58 to unlock drive mechanism 66 and allow movement of loader 10; and to hydraulic lock mechanism 60 to unlock hydraulic circuit 68 and allow manipulation of hydraulic cylinders 22 and 32. Also, controller 44 provides signals to display 62 which indicate that seat 19 is occupied, seat bar 21 is in the lowered position, hydraulic lock mechanism 60 has been sent a signal by controller 44 to unlock hydraulic circuit 68, traction lock mechanism 58 has been sent a signal by controller 44 to unlock drive mechanism 66 and controller 44 does not detect any system problems.

If controller 44 has not received a signal from seat sensor 46 indicating that seat 19 is occupied, and has not received a signal from seat bar sensor 48 indicating seat bar 21 is in the down position (as shown in FIG. 1) controller 44 provides appropriate signals to traction lock mechanism 58 and hydraulic lock mechanism 60, locking device mechanism 66 and hydraulic circuit 68.

It has been observed that, during normal operation of loader 10, the operator may occasionally bounce off of seat 19. When this occurs, seat sensor 46 provides momentary signals to controller 44 indicating that seat 19 is no longer occupied. Therefore, in the preferred embodiment, controller 44 requires seat sensor 46 to provide a signal indicating seat 19 is unoccupied for at least one second. Then, controller 44 provides an output to hydraulic lock mechanism 60 locking hydraulic circuit 68, but controller 44 does not lock drive mechanism 66. In this preferred embodiment, drive mechanism 66 remains unlocked until either seat bar 21 is lifted out of the lowered position shown in FIG. 1, or until traction lock switch 54 is actuated.

If, during operation of loader 10, the operator raises seat bar 21 to the raised position shown in phantom in FIG. 1, seat bar sensor 48 provides controller 44 with a signal indicating that seat bar 21 has been raised. Controller 44 then provides output signals to traction lock mechanism 58 to lock out drive mechanism 66 and hydraulic lock mechanism 60 to lock out hydraulic circuit 68.

Traction Lock Switch Function

During normal operation of loader 10, the operator can command controller 44 to lock drive mechanism 66, regardless of the signals returned to controller 44 by seat sensor 46 and seat bar sensor 48 by actuating traction lock switch 54, which, in the preferred embodiment, is actuated by an over-center pedal device. When traction lock switch 54 sends the appropriate signal to controller 44, controller 44 provides an output signal to traction lock mechanism 58 to lock drive mechanism 66. By reverse actuation of traction lock switch 54, which will remove the signal to controller 44, the state of traction lock mechanism 58 and drive mechanism 66 will once again depend upon the signals received from seat sensor 46 and seat bar sensor 48.

Traction Lock Override Function

It is sometimes desirable to move loader 10 when controller 44 has sent a signal to traction lock mechanism 58 to lock drive mechanism 66. For example, loaders, such as loader 10, are often equipped with a backhoe attachment front which includes its own seat mounted outside and to the front of cab 16. When an operator operates the backhoe attachment, seat sensor 46 typically indicates that seat 19 is unoccupied. The seat provided on the backhoe attachment is commonly a swivel seat so that the operator can face in a direction to operate the backhoe attachment, and swivel around to face cab 16.

The present invention provides a method to allow momentary movement of loader 10 when the normal requirements (sensors 46 and 48 signalling an operator in seat 19 and seat bar 21 down) needed for controller 44 to provide the appropriate output to traction lock mechanism 58 have not been met.

The present invention includes traction lock override switch 52, which, in the preferred embodiment is a momentary push button switch. When seat sensor 46 signals to controller 44 that there is not an operator in seat 19, the operator can actuate traction lock override switch 52 momentarily. This signal to controller 44 will cause controller 44 to send a signal to traction lock mechanism 58 to unlock drive mechanism 66, allowing movement of loader 10, provided that seat sensor 46 does not signal the presence of an operator in seat 19. Controller 44 will send the appropriate signal to traction lock mechanism 58 as directed by traction lock override switch 52, regardless of the signal received from seat bar sensor 48 and traction lock switch 54.

Once controller 44 has overridden the traction lock as described above, the operator can enable the traction lock by actuating traction lock override switch 52 a second time. Upon receiving a second signal from traction lock override switch 52, controller 44 will send a signal to traction lock mechanism 58 to lock drive mechanism 66, thereby ending the traction lock override condition and precluding further movement of loader 10. If, while the traction lock is overridden, controller 44 receives a signal from seat sensor 46 that an operator is present, controller 44 will send a signal to traction lock mechanism 58 to lock drive mechanism 66, thereby ending the traction lock override condition and precluding further movement of loader 10.

Error Mode Operation And Diagnostic Display

Controller 44 is configured to detect whether certain error conditions occur in circuit 42, and to display such error conditions as a diagnostic display at display 62. Display 62 is shown in greater detail in FIG. 3. In the preferred embodiment, display 62 includes five light emitting diodes (LEDs) 72, 74, 76, 78 and 80, all coupled to controller 44 within housing 82 which in this preferred embodiment is integral to controller assembly 45.

Figure 3:
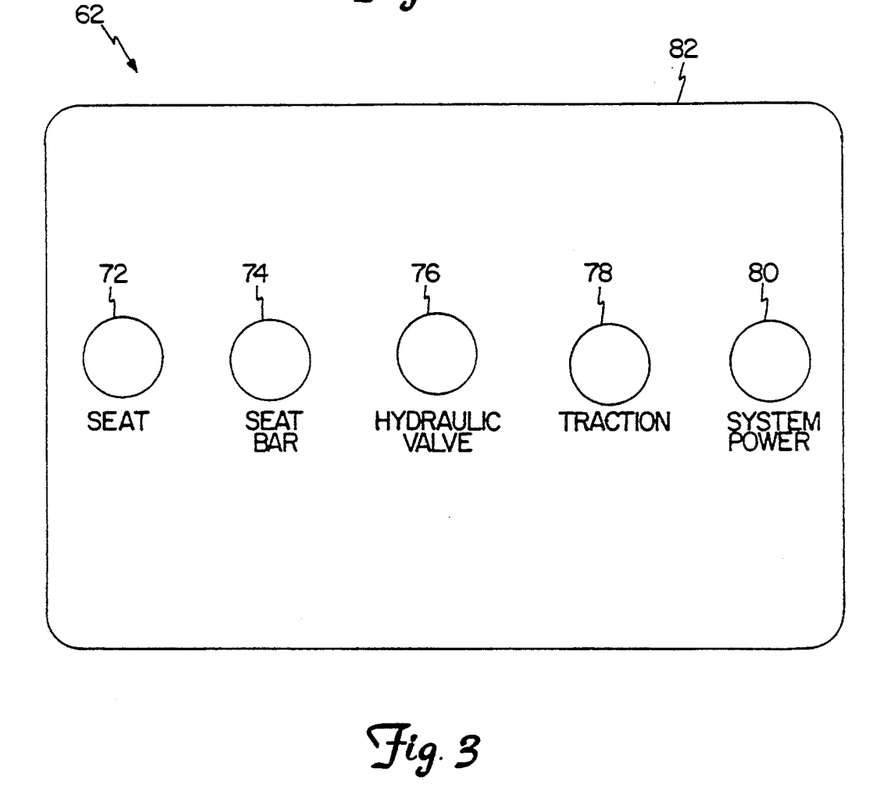
FIG. 3 is a drawing of a diagnostic display console according to the present invention.

LED 72 reflects the state of seat 19, based on the signal provided to controller 44 by seat sensor 46. In the preferred embodiment, when seat sensor 46 provides a signal to controller 44 indicating that seat 19 is occupied, controller 44 causes LED 72 to be illuminated. When seat sensor 46 provides a signal to controller 44 indicating that seat 19 is not occupied, controller 44 turns off LED 72.

LED 74 reflects the state of seat bar 21, based on the signal provided by seat bar sensor 48. In the preferred embodiment, when seat bar sensor 48 provides a signal indicating that seat bar 21 is in the down position as shown in FIG. 1, controller 44 causes LED 74 to be illuminated. When seat bar sensor 48 provides a signal indicating that seat bar 21 is not in the down position, controller 44 turns off LED 74.

LED 76 reflects the state of hydraulic lock mechanism 60. In the preferred embodiment, controller 44 causes LED 76 to be illuminated when controller 44 supplies the appropriate signal to hydraulic lock mechanism 60 to unlock hydraulic circuit 68. When controller 44 supplies the appropriate signal to hydraulic lock mechanism 60 to lock hydraulic circuit 68, controller 44 turns off LED 76.

LED 78 reflects the state of traction lock mechanism 58. In the preferred embodiment, controller 44 causes LED 78 to be illuminated when controller 44 supplies the appropriate signal to traction lock mechanism 58 to unlock drive mechanism 66. When controller 44 supplies the appropriate signal to traction lock mechanism 58 to lock drive mechanism 66, controller 44 turns off LED 78.

LED 80 reflects the state of ignition switch 50 and the relationship between controller 44 and watchdog timer 64. When ignition switch 50 is closed and the relationship between controller 44 and watchdog timer 64 is proper, controller 44 causes LED 80 to be illuminated. When ignition switch 50 is open or the relationship between controller 44 and watchdog timer 64 is not proper, LED 80 will be off. Watchdog timer 64 monitors an output line from controller 44. When watchdog timer 64 detects an error condition from controller 44, watchdog 64, in the preferred embodiment, signals to controller 44 to turn off LED 80. When LED 80 is off, LEDs 72, 74, 76 and 78 will be off and controller 44 will send signals to traction lock mechanism 58 to lock drive mechanism 66 and to hydraulic lock mechanism 60 to lock hydraulic circuit 68. Once off, LED 80 will stay off until ignition key 50 is cycled open and closed.

In the preferred embodiment, controller 44 is also configured to operate display 62 in a diagnostic fashion. Controller 44 can sense whether the inputs or outputs associated with LEDs 72, 74, 76, and 78 are experiencing an open circuit, short to battery or short to ground condition. If one of these three conditions is present, controller 44 will illuminate the corresonding LED in such a way as to clearly identify the problem.

In the preferred embodiment, if controller 44 senses an open circuit in the seat sensor circuit (which includes seat sensor 46 and conductors 47 which couple seat sensor 46 to controller assembly 45), controller 44 will turn off LED 72.

If controller 44 senses a short to battery condition in the seat sensor circuit, controller 44 will, in the preferred embodiment, blink LED 72 for two half second patterns each of which is comprised by 0.25 seconds where LED 72 is illuminated followed by 0.25 seconds where LED 72 is off. This half second blink pattern will be known as the LED diagnostic blink pattern and will be referred to several times in this section. Following two LED diagnostic blink patterns, LED 72 will stay off for an additional 2.25 seconds. This pattern will be repeated until controller 44 no longer senses a short to battery in the seat sensor circuit.

If controller 44 senses a short to ground condition in the seat sensor circuit, controller 44 will, in the preferred embodiment, cycle LED 72 through three diagnostic blink patterns after which LED 72 will remain off for an additional 1.75 seconds. This pattern will be repeated until controller 44 no longer senses a short to ground in the seat sensor circuit.

If one of the three diagnostic conditions should occur in the seat sensor circuit, controller 44 will consider the signal from seat sensor 46 as indicating that seat 19 is unoccupied and will handle the outputs to traction lock mechanism 58 and hydraulic lock mechanism 60 accordingly.

In the preferred embodiment, if controller 44 senses an open circuit in the seat bar sensor circuit (which includes seat bar sensor 48 and conductors 49 which couple seat bar sensor 48 to controller assembly 45), controller 44 will turn off LED 74.

If controller 44 senses a short to battery condition in the seat bar sensor circuit, controller 44 will, in the preferred embodiment, cycle LED 74 through two LED diagnostic blink patterns after which LED 74 will remain off for an additional 2.25 seconds. This pattern will be repeated until controller 44 no longer senses a short to battery in the seat bar sensor circuit.

If controller 44 senses a short to ground condition in the seat bar sensor circuit, controller 44 will, in the preferred embodiment, cycle LED 74 through three LED diagnostic blink patterns after which LED 74 will remain off for an additional 1.75 seconds. This pattern will be repeated until controller 44 no longer senses a short to ground in the seat bar sensor circuit.

If one of the three diagnostic conditions should occur in the seat bar sensor circuit, controller 44 will consider the signal from seat bar sensor 46 as indicating that seat 21 is unoccupied and will handle the outputs to traction lock mechanism 58 and hydraulic lock mechanism 60 accordingly.

In the preferred embodiment, if controller 44 senses an open circuit in the hydraulic lock mechanism circuit (which includes hydraulic lock mechanism 60 and conductors 95 which couple hydraulic lock mechanism 60 to controller assembly 45), controller 44 will cycle LED 76 through one LED diagnostic blink pattern after which LED 76 will remain off for an additional 2.75 seconds. This pattern will be repeated until ignition switch 50 is opened.

If controller 44 senses a short to battery condition in the seat bar sensor circuit, controller 44 will, in the preferred embodiment, cycle LED 76 through two LED diagnostic blink patterns after which LED 76 will remain off for an additional 2.25 seconds. This pattern will be repeated until ignition switch 50 is opened.

If controller 44 senses a short to ground condition in the hydraulic lock mechanism circuit, controller 44 will, in the preferred embodiment, cycle LED 76 through three diagnostic blink patterns after which LED 76 will remain off for additional 1.75 seconds. This pattern will be repeated until ignition switch 50 is opened.

If one of the three diagnostic conditions should occur in the hydraulic lock mechanism circuit, controller 44 will send the appropriate signal to hydraulic lock mechanism 60 to lock hydraulic circuit 68 until ignition switch 50 is opened.

LED 78 is similar to its operation to LED 76 except that it signals diagnostics for two output circuits. The first is the traction lock mechanism pull coil circuit, which includes pull coil 69 and conductors 97 which couple pull coil 69 to controller assembly 45. The second output circuit associated with LED 78 is the traction lock mechanism hold coil circuit, which includes hold coil 71 and conductors 99 which couple hold coil 71 to controller assembly 45.

If controller 44 senses an open circuit on the traction lock mechanism hold coil circuit, controller 44 will, in the preferred embodiment, cycle LED 78 through one diagnostic blink pattern after which LED 78 will remain off for an additional 2.75 seconds. If controller 44 senses an open circuit on the traction lock mechanism pull coil circuit, controller 44 will, in the preferred embodiment, cycle LED 78 through four diagnostic blink patterns after which LED 78 remains off for an additional 1.25 seconds. This pattern will be repeated until ignition switch 50 is opened.

If controller 44 senses a short to battery condition in the traction lock mechanism hold coil circuit, controller 44 will, in the preferred embodiment, cycle LED 78 through two diagnostic blink patterns after which LED 78 will remain off for an additional 2.25 seconds. If controller 44 senses a short to battery condition in the traction lock mechanism pull coil circuit, controller 44 will, in the preferred embodiment cycle LED 78 through five diagnostic blink patterns after which LED 78 remains off for an additional 0.75 seconds. This pattern will be repeated until ignition switch 50 is opened.

If controller 44 senses a short to ground condition in the traction lock mechanism hold coil circuit, controller 44 will, in the preferred embodiment, cycle LED 78 through three diagnostic blink patterns after which LED 78 will remain off for an additional 1.75 seconds. If controller 44 senses a short to battery condition in the traction lock mechanism pull coil circuit, controller 44 will, in the preferred embodiment, cycle LED 78 through six diagnostic blink patterns after which LED 78 remains off for an additional 0.25 seconds. This pattern will be repeated until ignition switch 50 is opened.

If a situation should occur where a diagnostic condition is detected on both the traction lock mechanism pull coil circuit and the traction lock mechanism hold coil circuit simultaneously, in the preferred embodiment, controller 44 will control LED 78 to blink the pattern associated with the traction lock mechanism hold coil circuit diagnostic condition.

If one of the three diagnostic conditions should occur in either the traction lock mechanism pull coil circuit or the traction lock mechanism hold coil circuit, controller 44 will send the appropriate signal to the traction lock mechanism 58 to lock drive mechanism 60 until ignition switch 50 is opened.

CONCLUSION

The present invention provides a control system for controlling operation of a skid steer loader. The control system senses operator occupancy, the state of the ignition switch, and the state of an operator actuable traction lock switch and controls lockout of the traction mechanism and the hydraulic actuators on the loader. The present invention also provides means for, under certain circumstances, overriding the normal operation of the traction lockout mechanism to allow momentary movement of the loader even during a lockout condition. In addition, the present invention provides a diagnostic display which displays to the operator certain fault conditions or failure conditions which exist in the control system. These features all provide significant advantages over prior systems.

Although the present invention has been described with reference to preferred embodiments, workers skilled in the art will recognize that changes may be made in form and detail without departing from the spirit and scope of the invention.

What is claimed is:

1. An apparatus for controlling operation of a skid steer loader having a frame, a seat supported by the frame, wheels supporting the frame, a drive mechanism for driving the wheels, a lift arm structure manipulated by hydraulic actuators, and a hydraulic circuit for controlling the hydraulic actuators, the apparatus comprising:

occupancy sensor means, coupled to the skid steer loader, for providing an occupancy signal indicative of occupancy in the seat;

traction lockout means, coupled to the drive mechanism, for locking the drive mechanism to preclude the drive mechanism from driving the wheels;

hydraulic valve means, coupled to the hydraulic circuit, for enabling operation of the hydraulic actuators;

controller means, coupled to the occupancy sensor means, the traction lockout means, and the hydraulic valve means, for sensing operational conditions of the occupancy sensor means, the traction lockout means and the hydraulic valve means, and for providing a traction output signal controlling the traction lockout means, a hydraulic output signal to an input of the hydraulic valve means controlling the hydraulic valve means, and a display output signal, based on the occupancy signal and based on the operational conditions sensed; and diagnostic display means, coupled to the controller means to provide a diagnostic display indicative of the operational conditions sensed based on the display output signal.

2. The apparatus of claim 1 and further comprising:
   controller operation sensing means, coupled to the controller means, for sensing controller operation and providing a controller operation signal indicating whether the controller means is operating in an undesirable manner, the diagnostic display means providing a display based on the controller operation signal.

3. The apparatus of claim 2 wherein the hydraulic valve means disables the hydraulic circuit when the controller operation signal indicates that the controller means is operating in an undesirable manner.

4. The apparatus of claim 3 wherein the controller operation sensing means comprises:
   a charge storage circuit, the controller means providing the charge storage circuit with a signal alternating between two logic states to successively charge and discharge the charge storage circuit;
   the charge storage circuit providing an output signal indicative of stored charge; and
   comparator means for comparing the output signal from the charge storage circuit to first and second thresholds and wherein the comparator means provides, at its output, the controller operation signal indicating that the controller means is operating in a desirable manner when the output signal is within the first and second thresholds and indicating that the controller means is operating in an undesirable manner when the output signal is not within the first and second thresholds.

5. The apparatus of claim 2 wherein the traction lockout means locks the drive mechanism when the controller operation signal indicates that the controller means is operating in an undesirable manner.

6. The apparatus of claim 1 wherein the skid steer loader further comprises a seat bar coupled for movement relative to the seat, and wherein the occupancy sensor comprises:
   a seat bar sensor, coupled to the seat bar, for sensing a position of the seat bar and providing a seat bar sensor signal indicative of the position of the seat bar; and
   a seat sensor, coupled to the seat, for sensing whether the seat is occupied and providing an occupancy signal indicative of occupancy in the seat; and
   wherein the controller means is coupled to the seat bar sensor and the seat sensor, the diagnostic display means comprising:
   first display means, coupled to the controller means, for displaying a first seat bar diagnostic display when the seat bar sensor operates correctly, and one of a plurality of seat bar failure diagnostic displays when the seat bar sensor fails in one of a plurality of manners.

7. The apparatus of claim 6 wherein the diagnostic display means further comprises:
   second display means, coupled to the controller means, for displaying a first seat sensor diagnostic display when the seat sensor operates correctly, and one of a plurality of seat sensor failure diagnostic displays when the seat sensor fails in one of a plurality of manners.

8. The apparatus of claim 7 wherein the diagnostic display means comprises:
   third display means, coupled to the controller means, for displaying a first hydraulic valve diagnostic display indicative of the hydraulic output signal when the hydraulic valve means operates correctly, and one of a plurality of hydraulic valve failure diagnostic displays when the hydraulic valve means fails in one of a plurality of manners.

9. The apparatus of claim 8 wherein the diagnostic display means comprises:
   fourth display means, coupled to the controller means, for displaying a first traction lock diagnostic display, indicative of the traction output signal, when the traction lock means operates correctly, and one of a plurality of traction lock failure diagnostic displays when the traction lock means fails in one of a plurality of manners.

10. The apparatus of claim 9 wherein the traction lockout means comprises:
    a locking member moveable between a locking position locking the traction mechanism and an unlocking position unlocking the traction mechanism;
    a first actuator for being energized to move the traction lock member between the locking and unlocking positions;
    a second actuator for holding the locking member in one of the locking and unlocking positions; and
    wherein a first of the plurality of traction lock failure diagnostic displays indicates when the first actuator fails in a first manner, and a second of the plurality of traction lock failure diagnostic displays indicates when the first actuator fails in a second manner.

11. The apparatus of claim 10 wherein the fourth diagnostic display means provides a third of the plurality of traction lock failure diagnostic displays when the second actuator fails in a first manner and a fourth of the plurality of traction lock failure diagnostic displays when the second actuator fails in a second manner.

12. The apparatus of claim 10 wherein the controller means controls the hydraulic valve means to disable the hydraulic circuit when one of the seat bar sensor, the seat sensor, and the hydraulic valve means, fails in one of the first and second manners.

13. The apparatus of claim 10 wherein the controller means controls the traction lockout means to lock the drive mechanism when one of the seat bar sensor, the seat sensor and the traction lockout means fails in one of the first and second manners.

14. The apparatus of claim 9 wherein the first, second, third and fourth diagnostic display means each comprise a light emitting diode and wherein the plurality of seat bar failure diagnostic displays, seat sensor failure diagnostic displays, hydraulic valve failure diagnostic displays, and traction lock failure diagnostic displays each comprise:
    the light emitting diodes blinking in a desired pattern.

15. An apparatus for controlling operation of a skid steer loader having a seat, wheels, a drive mechanism for driving the wheels, a lift arm structure manipulated by hydraulic actuators, and a hydraulic circuit for controlling the hydraulic actuators, the apparatus comprising:
    occupancy sensor means, coupled to the skid steer loader, for providing an occupancy signal indicative of occupancy in the seat;
    traction lock override means for providing a traction lock override signal;
    controller means, coupled to the traction lock override means and the occupancy sensor means, for providing a traction output signal and a hydraulic output signal based on the traction lock override signal and the occupancy signal;
    traction lockout means, coupled to the drive mechanism and the controller means, for locking the drive mechanism to preclude the drive mechanism from driving the wheels based on the traction output signal; and
    hydraulic lockout means, coupled to the hydraulic circuit and the controller means, for locking out operation of the hydraulic actuators based on the hydraulic output signal.

16. The apparatus of claim 15 wherein the traction lockout means comprises:
    a manually actuable lockout switch, coupled to the controller means, providing a lockout signal; and
    a lockout device, coupled to the controller means, for locking the drive mechanism, the controller means controlling the lockout device to lock the drive mechanism in response to the lockout signal.

17. The apparatus of claim 16 wherein the traction lock override means comprises:
    a manually actuable switch, coupled to the controller means, providing the traction lock override signal, the controller means controlling the lockout device to unlock the drive mechanism in response to the traction lock override signal.

18. The apparatus of claim 17 and further comprising a seat bar coupled for movement relative to the seat, and wherein the occupancy sensor means comprises:
    a seat bar sensor, coupled to the seat bar and the controller means, for sensing position of the seat bar and providing a seat bar sensor signal indicative of the position of the seat bar;

a seat sensor, coupled to the seat and the controller means, for sensing whether the seat is occupied and providing an occupancy signal indicative of occupancy in the seat; and wherein the controller means controls the lockout device based on the lockout signal and the seat bar sensor signal, regardless of the traction lock override signal, when the occupancy signal indicates that the seat is occupied.

19. The apparatus of claim 18 wherein the controller means controls the lockout device to lock the drive mechanism when the seat bar sensor signal indicates that the seat bar is in a first position;

wherein the controller means controls the lockout device to lock the drive mechanism when the occupancy signal indicates that the seat is unoccupied;

wherein the controller means controls the lockout device to lock the drive mechanism in response to the lockout signal; and wherein the controller means controls the lockout device to unlock the drive mechanism in response to the traction lock override signal, when the occupancy signal indicates that the seat is unoccupied, regardless of the seat bar sensor signal and the lockout signal.

20. The apparatus of claim 15 and further comprising a seat bar coupled for movement relative to the seat, and wherein the occupancy sensor means comprises:

a seat bar sensor, coupled to the seat bar and the controller means, for sensing position of the seat bar and providing a seat bar sensor signal indicative of the position of the seat bar;

a seat sensor, coupled to the seat and the controller means, for sensing whether the seat is occupied and providing an occupancy signal indicative of occupancy in the seat; and wherein the controller means controls the hydraulic lockout means to lock out operation of the hydraulic actuators when the seat sensor indicates the seat is unoccupied.

21. The apparatus of claim 20 wherein the controller means controls the traction lockout means to lock the drive mechanism when the seat sensor indicates that the seat is unoccupied.

22. The apparatus of claim 20 wherein the seat bar is movable between a first position and a second position and wherein the controller means controls the hydraulic lockout means to lockout operation of the hydraulic actuators when the seat bar sensor indicates that the seat bar is in one of the first and second positions.

23. The apparatus of claim 22 wherein the controller means controls the traction lockout means to lock the drive mechanism when the seat bar sensor indicates that the seat bar is in said one of the first and second positions.

24. The apparatus of claim 23 wherein the controller means controls the traction lockout means to unlock the drive mechanism and wherein the controller means controls the hydraulic lockout means to unlock operation of the hydraulic actuators when the seat sensor indicates that the seat is occupied and when the seat bar sensor indicates that the seat bar is in another of the first and second positions.

25. An apparatus for controlling operation of a skid steer loader having a frame, a seat supported by the frame, wheels supporting the frame, a drive mechanism for driving the wheels, a lift arm structure manipulated by power actuators, and a power circuit for controlling the power actuators, the apparatus comprising:

an ignition switch;

a seat bar coupled for movement relative to the seat;

a seat bar sensor, coupled to the seat bar for sensing position of the seat bar and providing a seat bar sensor signal indicative of the position of the seat bar;

a seat sensor, coupled to the seat, for sensing whether the seat is occupied and providing an occupancy signal indicative of occupancy in the seat; traction lock override means for providing a traction lock override signal;

controller means, coupled to the traction lock override means, the seat bar sensor, the ignition switch, and the seat sensor, for providing output signals including a traction output signal, a power output signal, and a display output signal, based on the traction lock override signal, the seat bar sensor signal, the occupancy signal, and the input from the ignition switch;

traction lockout means, coupled to the drive mechanism and the controller means, for locking the drive mechanism to preclude the drive mechanism from driving the wheels based on the traction output signal;

power lockout means, coupled to the power circuit and the controller means, for locking out operation of the power actuators based on the power output signal; and display means, coupled to the controller means, for displaying indicia indicative of an operational state based on the display output signal.

26. The apparatus of claim 25 and further including a manually actuable traction lock switch, coupled to the controller means, providing a lockout signal, and wherein the traction lock override means comprises:

a manually actuable switch, coupled to the controller means, providing the traction lock override signal, the controller means controlling the traction lockout means to unlock the drive mechanism in response to the traction lock override signal;

wherein the controller means controls the traction lockout means based on the lockout signal and the seat bar sensor signal, regardless of the traction lock override signal, when the occupancy signal indicates that the seat is occupied;

wherein the controller means controls the traction lockout means to lock the drive mechanism when the seat bar sensor signal indicates that the seat bar is in a first position;

wherein the controller means controls the traction lockout means to lock the drive mechanism when the occupancy signal indicates that the seat is unoccupied;

wherein the controller means controls the traction lockout means to lock the drive mechanism in response to the lockout signal; and wherein the controller means controls the traction lockout means to unlock the drive mechanism in response to the traction lock override signal, when the occupancy signal indicates that the seat is unoccupied, regardless of the seat bar sensor signal and the lockout signal.

27. The apparatus of claim 25 wherein the controller means alters the output signals in response to the occupancy signal after the seat sensor senses that the seat is unoccupied for a desired delay time period.

* * * * *